United States Patent Office 2,900,301
Patented Aug. 18, 1959

2,900,301

ROOM DISINFECTION BY MEANS OF VOLATILE SUBSTANCES IN THE FORM OF AEROSOLS

Karl Heinz Schmidt, Bad Soden, Taunus, Germany, assignor to Farbwerke Hoechst Aktiengesellschaft vormals Meister Lucius & Brüning, Frankfurt am Main, Germany, a corporation of Germany No Drawing. Application August 26, 1955
Serial No. 530,911

Claims priority, application Germany September 1, 1954

6 Claims. (Cl. 167—39)

The present invention relates to room disinfection by means of volatile substances in the form of aerosols.

It is known that for example propylene glycol or triethylene glycol is capable of killing germs suspended in the air. Such agents have, however, only a weak action on germs adhering to dust or living on the ground or other surfaces. Moreover, such compounds possess only a good activity when they are atomized with an apparatus in a rather troublesome manner, whereas simple vaporization with the aid of heat makes them much less effective. It is also known to vaporize formaldehyde whereby vigorous and acute irritant effects are produced with the necessary concentrations of 10 cc. per 1 cubic meter of space. For the purpose in question it has also been proposed to use essential oils and cyclohexane derivatives (see U.S. Patent 2,546,895). Still other preparations on the basis of essential oils, for example, coniferic oils, in many cases do not meet the requirements.

Now I have found that chloro-hydroxy-toluenes corresponding to the general formula:

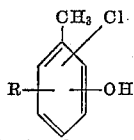

wherein R represents hydrogen or a lower alkyl radical, particularly 6-chloro-3-hydroxy-4-isopropyl toluene, in the form of aerosols, mist or gas, are surprisingly effective for combating bacteria, fungi and viruses, and greatly excel the action of other known preparations. The compounds of this invention are useful for combating microorganisms, insects and parasites; they may be used alone or dissolved in lipoid solvents, oils, fats or waxes, or in the form of an emulsion, or in a carrier, for example powder, or may be used in admixture with other active substances, for example eugenol, triethylene glycol, benzoic acid esters, essential oils, contact insecticides or respiratory poisons. The active substances are atomized or vaporized, for example by the external temperature, by heating or by means of a propellant from which or with which they are continuously sprayed to the surrounding space. They may also be given the form of aerosols with the aid of appropriate apparatus.

Compounds of the kind described above are, for example: 6-chloro-3-hydroxy-4-isopropyl-toluene, 2-chloro-4-hydroxy-toluene, 4-chloro-2-hydroxy-toluene, 4-chloro-3-hydroxy-toluene, 6-chloro-3-hydroxy-toluene, 5-chloro-2-hydroxy-4-butyl-toluene, 2-hydroxy-3 - propyl-4-chloro-toluene, 4-chloro-6-hydroxy-3-dimethylpropyl-toluene or 2-hydroxy-4-chloro-5-amyl-toluene.

The comparative tests which are given hereinafter by way of example have been carried out in the following manner: in each particular case the substances were carefully atomized or vaporized in a closed glass room by heating, or they were sprayed into said room by means of an evaporation apparatus such as a thermoplate or by means of a propellant, and were thus allowed to act on the test germs which were dried onto object carriers at room temperature.

The disinfecting action of chloro-hydroxy-toluenes in the form of aerosols, mist or gas is far superior to that of toluene (cf. Eichholtz, Lehrbuch der Pharmakologie) in aqueous suspension, for example for the preservation of urine or enzymes. Since, however, their in vitro effect in aqueous solution against gram negative and gram positive bacteria and fungi is likewise very small, it is not surprising that the practical use of, for example 6-chloro-3-hydroxy-4-isopropyl-toluene, has not been described in any pertinent publication (cf. R. Müller, Medizinische Mikrobiologie, Lehmanns Verlag, or Eichholtz: Lehrbuch der Pharmakologie).

Thus, for example, the in vitro effect showed that gram positive germs, such as staphylococci, are killed only at a concentration of 1:20000 after 4 hours, whereas gram negative germs (coli bacteria) are not even killed at a concentration of 1:10000 after 4 hours.

In most cases it is sufficient to atomize or vaporize 0.2 to 0.5 gram per cubic meter of room in order to obtain complete disinfection. The active substance may be vaporized in the evening and the room may be reopened in the next morning. Tests have, furthermore, indicated that in many cases the germs are killed even within some minutes.

Thus, it is obvious that disinfection according to this invention is much simpler than the known disinfecting methods by washing. The tolerability is likewise good. In the tests made with a concentration of 1:1 million and 1:2 millions, mice, rabbits and guinea pigs have been exposed overnight to the action of gaseous 6-chloro-3-hydroxy-4-isopropyl-toluene. The animals were and remained lively without ill-effects upon their health. Also the autopsy showed no pathologic findings.

The mixture of chloro-hydroxy-toluenes with eugenol, ethyl benzoate and triethylene glycol have a synergistic effect. Moreover, they offer the advantage of being sprayable in the form of a solution.

The following examples serve to illustrate the invention, but they are not intended to limit it thereto:

EXAMPLE 1

6-chloro-3-hydroxy-4-isopropyl-toluene is vaporized on small electrically heated dishes in a closed room of 12 cubic meters.

Into this room were placed the following gram negative and gram positive bacteria, fungi and viruses which had been dried onto object carriers: para-typhoid bacteria Breslau, typhoid viri, dysenteria (Shigella dysenteriae and Shiga-Kruse-Sonne strains), Proteus vulgaris, Staphyloc. aur. SG 511, Staphyloc. dim 13 (penicillin resistant), Streptoc. hemolyt. 77, Pneumoc. mucosus, Pneumoc. bacillus Friedländer, Penicillin glaucum, Mycobacterium Rabinovitsch, Tb. Gallinaceus strain and Louping ill virus.

Some test plates carrying the microorganisms were placed at the bottom of the room and other ones near the ceiling. The microorganisms were still killed with the following concentrations:

Table 1

Action of 6 - chloro - 3 - hydroxy-4-isopropyl-toluene (action overnight, about 12 hours), temperature 20° C., relative humidity 70 percent.

| Microorganism | Effective concentration, g./cc. of air | |
| --- | --- | --- |
| | Bottom | Ceiling |
| Para-typhoid bacteria | 1:5-10 millions | 1:5 millions. |
| Typhoid viri | do | 1:5-10 millions. |
| Dysenteria | do | Do. |
| Proteus | do | 1:5 millions. |
| *Pneum. mucosus* | do | 1:5-10 millions. |
| Pneum. Friedländer | do | Do. |
| Staphyloc. SG 511 | do | 1:2-1:5 millions. |
| Staph. dim 13 | do | 1:5-10 millions. |
| Strept. 77 | 1:2 millions | 1:1 million. |
| *Pen. glaucum* | 1:500,000 | 1:100,000. |
| Mycobact. Rabinovitsch | 1:5 millions | 1:2 millions. |
| Tb. gallinaceus strain | do | 1:5 millions. |
| Louping ill virus | 1:2-5 millions | 1:2-5 millions. |

At a concentration of 1:5 millions, air borne microorganisms, for example coli-bacteria and staphylococci, are killed with certainty, and at a concentration of 1:10 millions they are killed for a great part.

*Example 2*

The following table indicates the action of the above-mentioned chloro-hydroxy-toluenes, after vaporization, on some important bacteria. The concentrations given indicate the minimum effective amount of vaporized substance in grams per ccm. of room content (=weight/volume).

| Substance | Para-typhoid bacteria, Breslau | *Staph. aureus* SG 511 | *Prot. vulg.* | *Pen. glaucum* | Mycobact. Rabino-vitsch |
| --- | --- | --- | --- | --- | --- |
| I | 1:1 million | 1:100,000 | 1:500,000 | 1:50,000 | 1:50,000 |
| II | do | do | do | 1:50,000 | 1:50,000 |
| III | 1:2 millions | 1:2 millions | 1:2 millions | 1:50,000 | 1:100,000 |
| IV | do | do | do | 1:50,000 | 1:50,000 |
| V | do | do | do | 1:50-100,000 | 1:100,000 |
| VI | 1:1-2 millions | 1:1-2 millions | 1:1-2 millions | 1:100,000 | 1:100,000 |
| VII | 1:2-5 millions | 1:2-5 millions | 1:2-5 millions | 1:100,000 | 1:50,000 |
| VIII | do | do | do | 1:50,000 | 1:100,000 |

I=2-chloro-4-hydroxy-toluene.
II=4-chloro-2-hydroxy-toluene.
III=4-chloro-3-hydroxy-toluene.
IV=6-chloro-3-hydroxy-toluene.
V=5-chloro-2-hydroxy-4-butyl-toluene.
VI=2-hydroxy-3-propyl-4-chloro-toluene.
VII=4-chloro-6-hydroxy-3-dimethylpropyl-toluene.
VIII=2-hydroxy-4-chloro-5-amyl-toluene.

EXAMPLE 3

A solution of 6-chloro-3-hydroxy-4-isopropyl-toluene of 20 percent strength in eugenol has a synergistic effect on microorganisms (see Table 2). The solution was vaporized as described in Example 1. The effect is the same as with the spraying method.

Table 2

| Microorganism | Effective concentration (cc./cc. of air) | |
| --- | --- | --- |
| | Bottom | Ceiling |
| Para-typhoid bacteria | 1:5-10 millions | 1:2-5 millions. |
| Typhoid bacteria | do | 1:5-10 millions. |
| Dysenteria | 1:5 millions | 1:2-5 millions. |
| Proteus | 1:5-10 millions | 1:5-10 millions. |
| *Pneum. mucosus* | 1:10 millions | 1:10 millions. |
| Pneum. Friedländer | 1:5-10 millions | Do. |
| Staph. SG 511 | 1:2-5 millions | 1:2-5 millions. |
| Staph. dim 13 | do | Do. |
| Strept. 77 | do | Do. |
| *Pen. glaucum* | 1:1-2 millions | 1:1-2 millions. |
| Mycobact. Rabinovitsch | 1:2 millions | 1:2 millions. |
| Tb. gallinaceus strain | do | Do. |
| Louping ill virus | 1:2-5 millions | Do. |

Eugenol alone is less effective (for example *Staphyl. aureus* 1:500.000, Parat. B 1:1 million, Mycobact. Rabinovitsch 1:500.000).

EXAMPLE 4

A mixture consisting of 19 percent of 6-chloro-3-hydroxy-4-isopropyl-toluene, 39 percent of benzoic acid ethyl ester, 40 percent of triethylene glycol and 2 percent of citronell (Ceylon or Java) is vaporized or sprayed in an amount of 0.5 or 1 cc. per cubic meter of room.

EXAMPLE 5

A mixture consisting of 10 percent of 6-chloro-3-hydroxy-4-isopropyl-toluene, 19 percent of eugenol, 69 percent of triethylene glycol and 2 percent of citronell is vaporized or sprayed in an amount of, for example, 0.5 to 1 cc. per cubic meter of room.

EXAMPLE 6

A spray can containing 20 percent of the mixture described in Example 4, 40 percent of difluoro-dichloromethane (F 12) and 40 percent of trichlorofluoro-methane is sprayed, for example, into a cupboard. The concentration of 1 cc. active substance per cubic meter of room is attained by counting in seconds.

EXAMPLE 7

A spray can containing 20 percent of the mixture described in Example 5, 40 percent of difluoro-dichloromethane and 40 percent of trichlorofluoro-methane is sprayed as described in Example 6.

EXAMPLE 8

A spray can containing 20 percent of 6-chloro-3-hydroxy-4-isopropyl-toluene, 40 percent of difluorodichloromethane and 40 percent of trichlorofluoromethane is sprayed as described in Examples 6 and 7.

I claim:

1. The method of killing microorganisms in room disinfection which comprises atomizing 6-chloro-3-hydroxy-4-isopropyl-toluene as the main active toxicant.

2. The method of killing microorganisms in room disinfection which comprises atomizing a mixture of 6-chloro-3-hydroxy-4-isopropyl-toluene and eugenol.

3. The method of killing microorganisms in room disinfection which comprises atomizing a solution of about 20 percent 6-chloro-3-hydroxy - 4 - isopropyl - toluene in eugenol.

4. The method of killing microorganisms in room disinfection which comprises atomizing a mixture of 19 percent 6-chloro-3-hydroxy-4-isopropyl-toluene, 39 percent benzoic acid ethyl ester and about 40 percent triethylene glycol.

5. The method of killing microorganisms in room disinfection which comprises atomizing a mixture essentially containing 19 percent 6-chloro-3-hydroxy-4-isopropyl-toluene and 39 percent benzoic acid ethyl ester.

6. The method of killing microorganisms in room disinfection which comprises atomizing a mixture essentially containing 19 percent 6-chloro-3-hydroxy-4-isopropyltoluene and 40 percent triethylene glycol.

References Cited in the file of this patent

UNITED STATES PATENTS

| | | |
|---|---|---|
| 2,546,895 | Jarowski | Mar. 27, 1951 |

FOREIGN PATENTS

| | | |
|---|---|---|
| 9,103 | Great Britain | 1890 |
| 118,667 | Great Britain | Sept. 3, 1918 |
| 536,247 | Great Britain | May 8, 1941 |
| 859,202 | Germany | Dec. 11, 1952 |

OTHER REFERENCES

U. S. Dispensatory, 24th ed., 1947, Lippincott Co., Phila., p. 461.

Chem. Abstr., vol. 32, 1938, page 616$^2$.

Youmans et al.: "Bacteriostatic Activity of 3500 Organic Compounds for Myco. Tb. Var Hominis," N.R.C. Rev., No. 4, 1953, pp. 57, 58, 69, 93, 138 pert.

Klarman et al.: J. Am. Chem. Soc., vol. 55, June 1933, p. 2583.